US011301369B2

(12) United States Patent
Gholamipour et al.

(10) Patent No.: US 11,301,369 B2
(45) Date of Patent: Apr. 12, 2022

(54) LOGICAL TO PHYSICAL MAPPING MANAGEMENT USING LOW-LATENCY NON-VOLATILE MEMORY

(71) Applicant: Western Digital Technologies, Inc., San Jose, CA (US)

(72) Inventors: Amir Hossein Gholamipour, Anaheim, CA (US); Mark David Myran, Trabuco Canyon, CA (US); Chandan Mishra, Irvine, CA (US); Namhoon Yoo, Anaheim, CA (US); Jun Tao, Ladera Ranch, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 617 days.

(21) Appl. No.: 16/256,994

(22) Filed: Jan. 24, 2019

(65) Prior Publication Data

US 2020/0242021 A1 Jul. 30, 2020

(51) Int. Cl.
*G06F 12/00* (2006.01)
*G06F 11/00* (2006.01)
*G06F 12/02* (2006.01)
*G06F 11/14* (2006.01)
*G06F 12/0804* (2016.01)

(52) U.S. Cl.
CPC ...... *G06F 12/0246* (2013.01); *G06F 11/1441* (2013.01); *G06F 11/1471* (2013.01); *G06F 12/0804* (2013.01); *G06F 2201/81* (2013.01); *G06F 2201/84* (2013.01); *G06F 2212/1024* (2013.01); *G06F 2212/7201* (2013.01); *G06F 2212/7203* (2013.01)

(58) Field of Classification Search
CPC ............. G06F 12/0246; G06F 12/0804; G06F 11/1441; G06F 11/1471
See application file for complete search history.

(56) References Cited

U.S. PATENT DOCUMENTS

| 9,213,633 | B2 * | 12/2015 | Canepa | G06F 12/0246 |
| 9,927,985 | B2 * | 3/2018 | Zhang | G06F 11/1441 |
| 2012/0203958 | A1 * | 8/2012 | Jones | G06F 12/0246 711/103 |

* cited by examiner

*Primary Examiner* — Reginald G Bragdon
*Assistant Examiner* — Michael L Westbrook
(74) *Attorney, Agent, or Firm* — Morgan, Lewis & Bockius LLP (57) ABSTRACT

Disclosed are systems and methods for providing logical to physical (L2P) table management using low-latency NVM to reduce solid state drive (SSD) random access memory (RAM) footprint. A method includes determining a logical to physical (L2P) mapping of a logical address to a physical address in a flash storage, for an operation directed to the logical address. The method also includes adding a data entry, comprising the L2P mapping, to an open journal structure in RAM. The method also includes adding a log entry, comprising the L2P mapping, to a buffer in the RAM. The method also includes flushing the buffer to a low-latency NVM storage in response to determining that the buffer has satisfied a size threshold. Reads, snapshotting and L2P table recovery are also described.

18 Claims, 6 Drawing Sheets

LOGICAL TO PHYSICAL MAPPING MANAGEMENT USING LOW-LATENCY NON-VOLATILE MEMORY

BACKGROUND

The growing demand for data storage has resulted in the manufacture and deployment of large capacity flash storage devices. Multi-terabyte device capacities, such as 64 TB and larger, are attainable using three-dimensional NOT-AND (3D NAND) flash and multi-level cells, such as triple level cells (TLC, 3 bits per cell), quad level cells (QLC, 4 bits per cell), and beyond. To support the operation of these large storage devices, the metadata and bookkeeping structures also expand in tandem. For some use cases, such as enterprise data centers and professional workstations, this metadata is preferably stored in high-performance random access memory (RAM) to meet application latency and bandwidth requirements. However, increasing the RAM size to accommodate the metadata also increases fabrication costs and device power consumption. Thus, there is a need to support the operation of large capacity flash storage devices in an efficient manner.

The description provided in the background section should not be assumed to be prior art merely because it is mentioned in or associated with the background section. The background section may include information that describes one or more aspects of the subject technology, and the description in this section does not limit the invention.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

The present description relates in general to data storage systems and methods, and more particularly to, for example, without limitation, providing logical to physical (L2P) table management using low-latency non-volatile memory (NVM) to reduce solid state drive (SSD) random access memory (RAM) footprint. As discussed above, metadata for supporting SSD operations increases in tandem with SSD capacity. For example, storing an L2P table may require approximately 0.1% of the SSD storage capacity. To provide sufficient performance for enterprise applications and other demanding use cases, the L2P table needs to be stored in high-performance storage such as RAM. However, when the SSD storage capacity grows to a very large number, then it may not be feasible to provide the amount of RAM necessary to store the L2P table, e.g., approximately 64 GB of RAM for an SSD with 64 TB of storage capacity. On the other hand, providing logical to physical (L2P) table management using low-latency NVM enables the L2P table RAM requirement to be reduced to approximately 3-6% of an SSD that stores the L2P table in RAM.

One or more implementations of the subject technology provides several performance benefits that improve the functionality of a computer. By reducing RAM requirements of the SSD, fabrication costs may be greatly reduced. Further, since RAM generally requires continuous power to maintain data values in RAM, power consumption of the storage device may also be greatly reduced. Even further, by providing a separate low-latency NVM area for the storage of L2P journal records, write collisions between L2P journal writes and user data writes can be avoided, potentially improving write performance. By using non-volatile low-latency NVM for L2P snapshots and journal records, L2P table rebuilds can be simplified and expedited, reducing system downtime. The reduced cost from the reduced RAM requirement can also translate to improved storage device performance by enabling bill of materials (BOM) to focus on other components to improve various performance metrics of the storage device, such as write endurance, read/write bandwidth, read/write latency, and/or storage capacity. In turn, a host computer coupled to the storage device also receives the benefits of the storage device's improved performance.

Figure 1A:
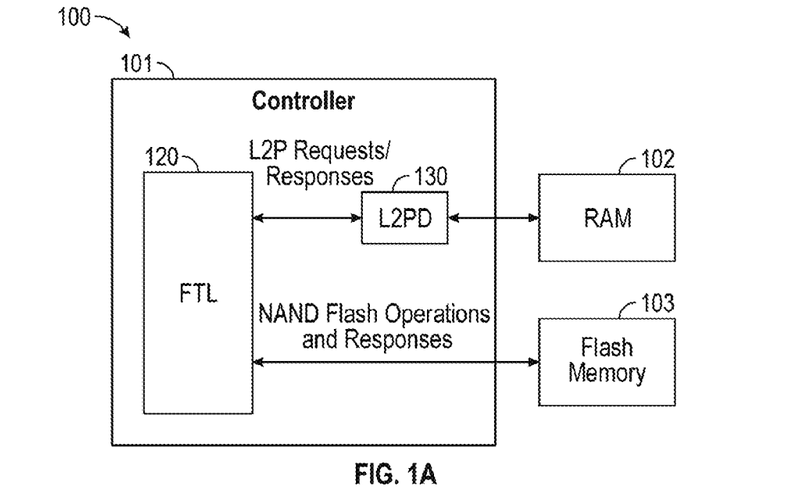
FIG. 1A illustrates an example system for providing logical to physical (L2P) management in a storage device.

FIG. 1A illustrates an example system 100 for providing logical to physical (L2P) management in a storage device. System 100 includes controller 101, random access memory (RAM) 102, and flash memory 103. Controller 101 includes flash translation layer (FTL) 120 and L2P director (L2PD) 130. With respect to FIG. 1A and FIG. 5, like numbered elements may correspond to like components. For example, controller 101 may correspond to controller 501, RAM 102 may correspond to storage medium 502, and flash memory 103 may correspond to flash memory 503. For simplicity, elements of FIG. 5 that are omitted from system 100 of FIG. 1A may actually be present, such as host 504, interface 505, registers 506, controller 507, and NAND array 508.

Controller 101 may use an L2P table to provide flexibility in data addressing and to abstract away the specific physical addresses used to store data. If an L2P table were not present, then a host computer would instead directly manage the physical address mappings, increasing operating system complexity and reducing device interoperability. FTL 120 may include SSD specific background processes, such as wear leveling and garbage collection, that cause a remapping of the underlying physical addresses used to store data. Further, with the assistance of L2PD 130, FTL 120 may provide address translations and perform metadata bookkeeping to support reads, writes, erases, and other data operations. Thus, FTL 120 may send requests to L2PD 130 to create, modify, or delete L2P mappings.

The L2P table for the L2P mappings may be stored in RAM 102, which may correspond to dynamic RAM (DRAM) or static RAM (SRAM). Since RAM 102 may be volatile and subject to data loss when a power loss or power failure occurs, L2PD 130 may instruct FTL 120 to store journal records for the L2P table in flash memory 103. The journal records can be used to rebuild the L2P table after power is restored, thereby ensuring data integrity. However, the journal records occupy space in flash memory 130 that could otherwise be used to support larger user data capacity, more overprovisioning, or other productive uses to enhance various performance metrics of the storage device. Further, write contention between host write operations and journal record updates may reduce I/O performance.

Figure 1B:
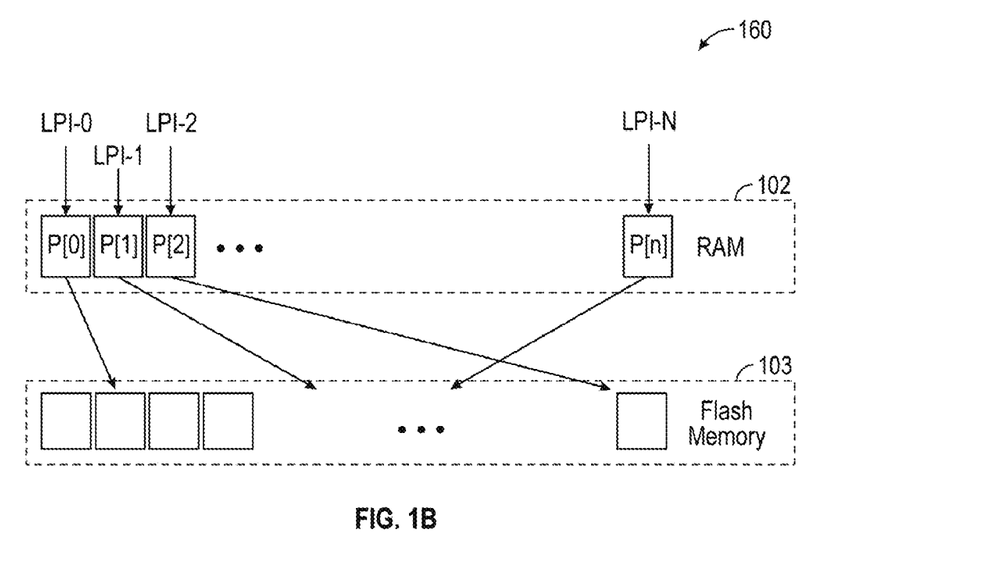
FIG. 1B illustrates an example metadata structure for an L2P table.

FIG. 1B illustrates example metadata structure 160 for an L2P table. As shown in metadata structure 160, an array "P" stored in RAM 102 includes records from 0 to "n", wherein "n" is the maximum logical page index (LPI). Each record in the array "P" maps to a specific physical page in flash memory 103, for example by index or pointer value. FTL 120 may send a request to L2PD 130 to retrieve an L2P mapping, to allocate an L2P mapping, or to erase an L2P mapping.

For example, FTL 120 may send a request to L2PD 130 to retrieve a physical page mapped to a specific LPI, such as LPI-2. L2PD 130 may access RAM 102 and return P[2] to respond to the request, wherein P[2] comprises an index or pointer value that maps to the final physical page of flash memory 103.

In another example, FTL 120 may send a request to L2PD 130 to allocate one or more LPIs to corresponding physical pages. L2PD 130 may determine the allocation according to metadata for flash memory 103, which may be stored in one or more of FTL 120, RAM 102, flash memory 103, or other suitable locations. For example, FTL 120 may determine the allocation based on memory block metadata for program and erase (P/E) cycles, bit error rates (BER), or other criteria. The "P" array may be updated accordingly, and pointers or indexes to the corresponding physical pages may be returned to FTL 120.

In yet another example, FTL 120 may send a request to L2PD 130 to erase an L2P mapping. The mapping may thus be erased in array "P", for example by setting the associated records to a zero, null, or other predetermined value. Additionally, or alternatively, a separate free space bitmap may be updated to indicate which records in array "P" contain valid mappings. The free space bitmap may indicate free space for groups of records, such as for partition groups as discussed below.

When L2PD 130 modifies array "P", L2PD 130 also instructs FTL 120 to record corresponding updates in a journal stored in flash memory 103. In one approach, L2PD 130 may divide the address space of the "P" array into partition groups of a fixed size, for example partition groups of 32 adjacent entries. When a modification occurs in a particular partition group, then the partition group may be cached into log buffers stored in RAM 102. Once the log buffers reach a predetermined threshold size, for example a physical page size of flash memory 103, then L2PD 130 may instruct FTL 120 to flush the log buffers to a journal in flash memory 103, and any corresponding metadata structures may also be updated.

For example, a partition table in flash memory 103 may be updated with the addresses of the journaled partition groups in flash memory 103. To rebuild the L2P table on device power on, the partition table may be scanned and parsed to repopulate the "P" array in RAM 102. Note that controller 101 may employ some protection against power failure for uncommitted log buffers in RAM 102, for example by flushing the log buffers to non-volatile storage using a backup power source when a power failure is detected.

As shown in metadata structure 160, "n" records are stored in RAM 102, wherein "n" scales directly with SSD storage capacity, or the number of addressable physical pages. Further, the data size of each record in the array "P" also grows with SSD storage capacity, as a larger number of bits are needed to cover a larger physical address range.

For example, consider a SSD with a 64 TB ($2^{46}$ bytes) storage capacity. As discussed above, an L2P table may require approximately 0.1% of the SSD storage capacity, which corresponds to 64 GB L2P table for a 64 TB SSD. Assuming 4 KB ($2^{12}$ bytes) physical pages and assuming that one logical page maps to one physical page, the maximum LPI for a 64 TB SSD is n=$2^{34}$, and each table record requires a 34-bit integer data type to address the n physical pages. Thus, RAM 102 must include enough capacity to store 34*n bits, or approximately 64 GB ($2^{36}$ bytes), to store metadata structure 160 for a 64 TB SSD. While this required capacity may be reduced by using larger logical page sizes, this may also result in reduced storage capacity due to the correspondingly larger minimum allocation unit.

Thus, the 0.1% approximation, or 1:1000 ratio of L2P table metadata to storage capacity is confirmed. Configuring RAM 102 to provide 64 GB of L2P table storage for a 64 TB SSD may not be feasible from a cost or power consumption perspective. Thus, the system 100 shown in FIG. 1A may not readily scale for larger flash storage device capacities, such as 64 TB and beyond.

Figure 2A:
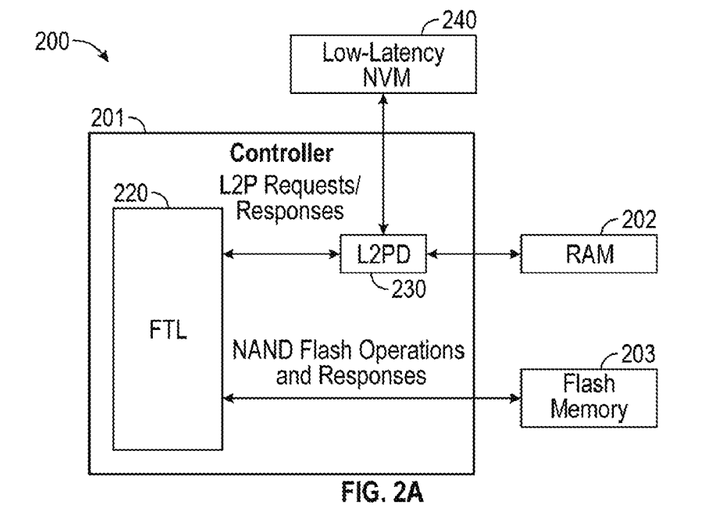
FIG. 2A illustrates an example system for providing L2P management using low-latency non-volatile memory (NVM) in a storage device.

FIG. 2A illustrates an example system 200 for providing L2P management using low-latency NVM 240 in a storage device. System 200 includes controller 201, random access memory (RAM) 202, flash memory 103, and low-latency NVM 240. Controller 201 includes flash translation layer (FTL) 220 and L2P director (L2PD) 230. With respect to FIG. 1A, FIG. 2A and FIG. 5, like numbered elements may correspond to like components. For example, controller 201 may correspond to controller 101 or 501, RAM 202 may correspond to RAM 102 or storage medium 502, and flash memory 203 may correspond to flash memory 103 or 503.

As shown in FIG. 2A, system 200 differs from system 100 by adding low-latency NVM 240, which may correspond to a type of non-volatile memory with lower latency than flash memory 203. For example, low-latency NVM 240 may correspond to single-level cell (SLC) 3D NAND flash with read and program (write) times of approximately 3 μs and 35-50 μs, respectively. This may be approximately 5 times faster than conventional SLC NAND. While low-latency NVM 240 uses NAND flash memory in FIG. 2A, other types of non-volatile memory with suitable performance characteristics may also be used. Flash memory 203 may correspond to 2D or 3D NAND flash memory types in TLC, QLC, or higher multi-level cell modes with relatively higher read and write latencies, such as in the hundreds of μs. RAM 202 may have read and write latencies that are orders of magnitude lower than either flash memory 203 or low-latency NVM 240, for example by having read and write times measured in tens of nanoseconds. Thus, system 200 may provide three types of storage, wherein a third storage (e.g., RAM 202) has a lower latency than a second storage (e.g., low-latency NVM 240), which has a lower latency than a first storage (e.g., flash memory 203).

In system 200, L2PD 230 is configured to store snapshots and journals for the L2P table in low-latency NVM 240 while storing metadata structures in RAM 202 to provide high-speed L2P resolution. The metadata structures support L2P resolution up to a predetermined number of mappings that is less than the maximum number of L2P mappings. Since a portion rather than the entirety of the L2P table is stored, the metadata structures may utilize logical page sizes that match the physical page sizes of flash memory 203, e.g., 4K pages, even for large capacity drives with high bit address ranges. RAM 202 can thus be configured with a fraction of the capacity of RAM 102, such as 3-6% of RAM 102, depending on the chosen sizes for the metadata structures. As a result, a 64 GB RAM requirement for RAM 102 in a 64 TB capacity SSD can be reduced to a 2-4 GB RAM requirement for RAM 202 in a same 64 TB capacity SSD, dramatically reducing cost and power consumption.

The adoption of L2PD 230 and low-latency NVM 240 may minimally impact the performance and quality of service (QoS) for the storage device. For example, low queue depth (QD) latency of the storage device may increase by less than 5%. On the other hand, besides the reduced RAM footprint as described above, the use of L2PD 230 may provide other benefits that outweigh the minimal performance impacts. For example, write collisions between journal updates and user data updates in flash memory 103 can be completely avoided in L2PD 230 as journal updates are written separately to low-latency NVM 240. Logging and L2P table rebuilds can also be performed faster and simpler, as described in further detail below. Moreover, since the software or firmware changes to replace L2PD 130 can be made modularly to L2PD 230, minimal or no changes may be necessary for other portions of controller 201, such as FTL 220, simplifying implementation and deployment.

Figure 2B:
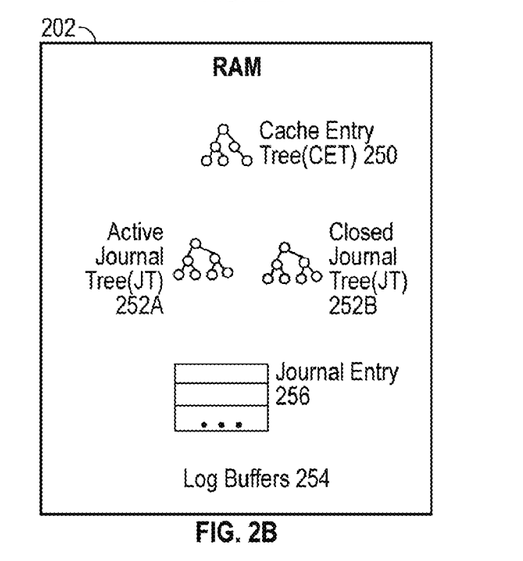
FIG. 2B illustrates example metadata structures in random access memory (RAM) to support storage of an L2P table in low-latency NVM.

FIG. 2B illustrates example metadata structures in random access memory (RAM) 202 to support storage of an L2P table in low-latency NVM. RAM 202 includes cache entry tree (CET) 250, journal tree (JT) 252A, journal tree (JT) 252B, and log buffers 254. Log buffers 254 include journal entry 256. With respect to FIG. 2B, RAM 202 may correspond to RAM 202 from FIG. 2A.

Figure 2C:
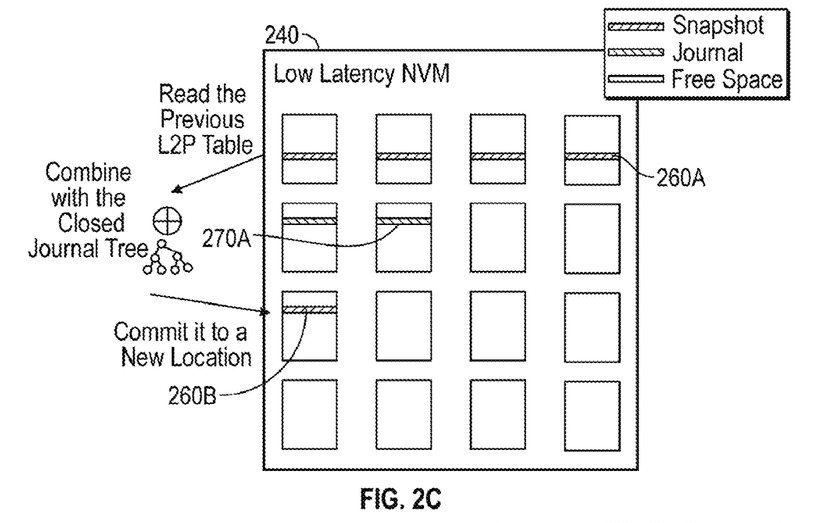
FIG. 2C illustrates example metadata structures for storing an L2P table in low-latency NVM.
Figure 2D:
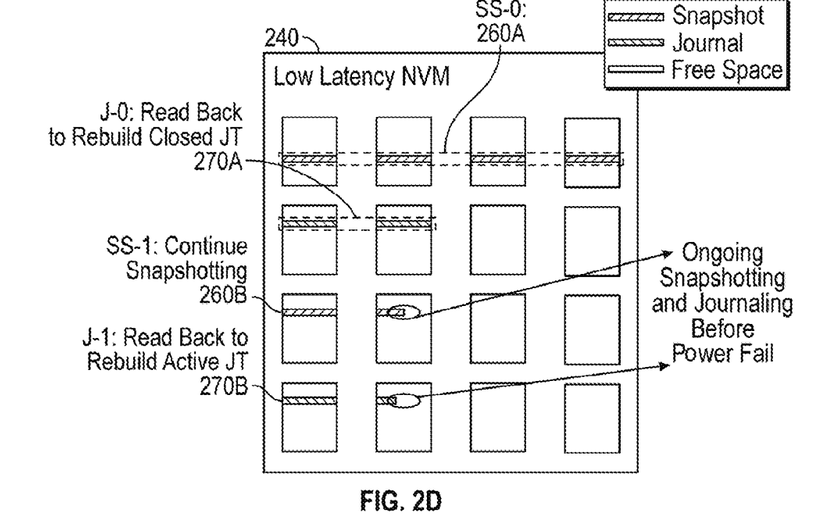
FIG. 2D illustrates a data flow diagram for an L2P table rebuild process with L2P management using low-latency NVM in a storage device.
Figure 3:
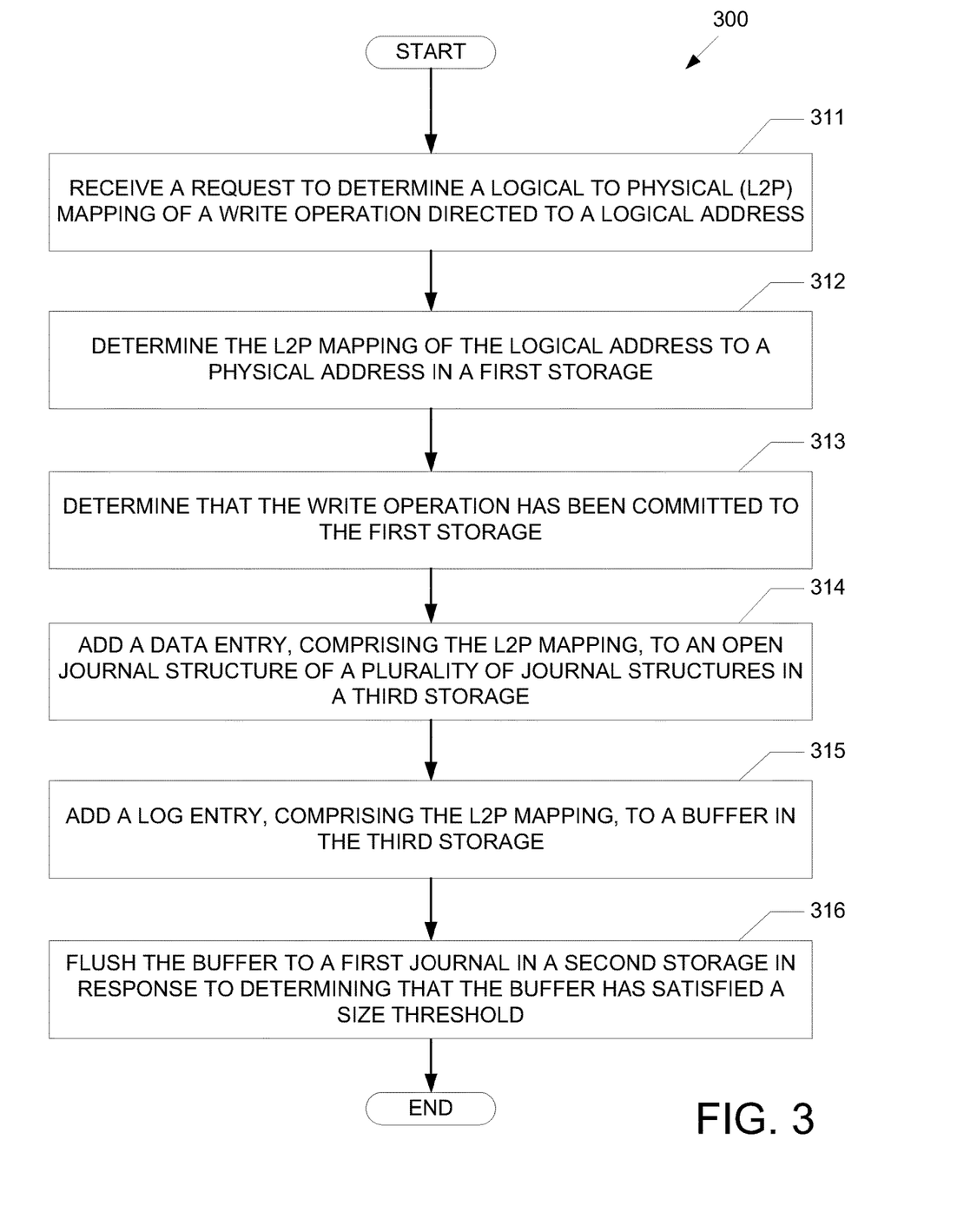
FIG. 3 is a flowchart illustrating an example process for processing a write operation with L2P management using low-latency NVM in a storage device.

It may be instructive to describe the metadata structures shown in FIGS. 2B, 2C and 2D with respect to FIG. 3, a flowchart illustrating an example process 300 for processing a write operation with L2P management using low-latency NVM 240 in a storage device. One or more blocks of FIG. 3 may be executed by a computing system (including, e.g., a controller of a flash memory, a data storage controller of a data storage system or a solid state storage device (SSD), a processor, or the like). Examples of a computing system or a controller may be controller 501 and/or 507. Similarly, a non-transitory machine-readable medium may include machine-executable instructions thereon that, when executed by a computer or machine, perform the blocks of FIG. 3. The steps of process 300 may be implemented as hardware/firmware or software.

In block 311, referring to FIG. 2A, controller 201 receives a request to determine a logical to physical (L2P) mapping of a write operation directed to a logical address. L2PD 230 may, for example, receive a L2P request from FTL 220 for resolving a L2P mapping for a logical address, or a logical page index (LPI).

A cache address to a cache area may also be received, wherein the cache area stores the data to be written for the logical address of the L2P mapping request. A corresponding node with the requested LPI and the associated cache address may be inserted into CET 250. CET 250 may correspond to a balanced binary tree, such as an Adelson-Velsky and Landis (AVL) tree, but other data structures may be used, such as hash tables. Thus, the tree size of CET 250 may be limited by the number of cache entries available in controller 201 or elsewhere in the storage device. L2PD 230 may inform FTL 220 that the update of CET 250 was successful.

In block 312, referring to FIG. 2A, controller 201 determines the L2P mapping of the logical address to a physical address in flash memory 203. As discussed above, the specific physical address to select may be based on metadata maintained for flash memory 203, such as P/E cycles and BER for flash memory blocks.

In block 313, referring to FIG. 2A, controller 201 determines that the write operation has been committed to flash memory 203. For example, L2PD 230 may receive an update from FTL 220 that the write operation has been committed to flash memory 203 and that the L2P table should be updated accordingly. The node previously inserted into CET 250 may now be removed from CET 250. Note that CET 250 may be discarded in the case of a power failure, as CET 250 only includes pointers to cached non-committed writes that are recoverable from a journal stored in low-latency NVM 240.

In block 314, referring to FIGS. 2A and 2B, controller 201 adds a data entry, comprising the L2P mapping determined from block 312, to an open journal structure (e.g., JT 252A) from JT 252A and JT 252B in RAM 202. For example, JT 252A and 252B may correspond to balanced binary trees, similar to CET 250, but other data structures may be used, such as hash tables. As shown in FIG. 2B, JT 252A may initially be designated as an open or active JT (accepting node insertions), whereas JT 252B may initially be designated as a closed JT (not accepting node insertions). Thus, in block 314, a node (data entry) with the L2P mapping of block 312 is inserted (added) into JT 252A.

JT 252A and JT 252B may be configured to store up to a predetermined number of nodes, which may be some ratio or percentage of the maximum number of L2P mappings, or the maximum LPI "n" in FIG. 1B. For example, the ratio may be ⅛ or less than "n", such as $\frac{1}{16}$, $\frac{1}{32}$, $\frac{1}{64}$, or another ratio of "n". This ratio may be adjusted to balance tradeoffs in the write endurance of low-latency NVM 240 and the required space for the metadata structures in RAM 202.

Once JT 252A reaches the predetermined number of nodes and is full, then a snapshotting process may begin, as discussed in further detail below in conjunction with FIGS. 2C and 2D. The snapshotting process may change JT 252A from active to closed, and JT 252B from closed to active. Thus, subsequent node insertions may insert into JT 252B. This active JT swapping process may be repeated for each snapshotting, thereby ping-pong swapping the active JT between JT 252A and JT 252B.

In block 315, referring to FIGS. 2A and 2B, controller 201 adds a journal entry 256, comprising the L2P mapping from block 312, to a buffer (e.g., log buffers 254 in RAM 202). For example, the journal entry 256 may be appended to the tail of log buffers 254. The journal entry 256 contains the same information as the node that was inserted into JT 252A in block 314, or the L2P mapping from block 312.

In block 316, referring to FIG. 2A, controller 201 flushes log buffers 254 to a first journal in low-latency NVM 240 in response to determining that log buffers 254 has satisfied a size threshold. Log buffers 254 may be configured to store log or journal entries up to a size threshold, which may correspond to a physical page size of low-latency NVM 240, such as 4K. When log buffers 254 is determined to be full, for example when an additional journal entry would exceed the size threshold, then the log buffers 254 may be flushed to a first journal of low-latency NVM 240. In the case of a power failure, log buffers 254 may be saved to non-volatile memory. Since the information in JT 252A and 252B is already stored in either saved log buffers 254 or low-latency NVM 240, JT 252A and 252B may be discarded on power failure.

FIG. 2C illustrates example metadata structures for storing an L2P table in low-latency NVM 240. As shown in FIG. 2C, low-latency NVM 240 includes snapshots such as snapshot 260A and 260B, journals such as journal 270A, and free or unallocated space. In the example shown in FIG. 2C, low-latency NVM 240 is divided into 16 separate dies, but any physical arrangement may be utilized.

Snapshots may correspond to an entire L2P table for flash memory 203 that is consistent with a specific point in time. Thus, a snapshot may appear similar to the "P" array in metadata structure 160 shown in FIG. 1B, although other data structures may be utilized as well. Journals may correspond to updates since the last completed snapshot. Thus, journal 270A may correspond to updates since snapshot 260A. In block 316 described above, the log buffers 254 may be appended to the end of journal 270A, or the current journal. Accordingly, combining the last completed snapshot, or snapshot 260A, with the current journal, or journal 270A, provides a rebuild of the most up-to-date and current L2P table for flash memory 203.

As discussed above, when a journal structure is full, then a snapshot process is initiated. The previously open and active journal structure, e.g., JT 252A, is closed, and another journal structure, e.g., JT 252B, is made to be the new open and active journal structure. L2PD may thus continue to service L2P requests using JT 252B while creating snapshot 260B in a new and different location within low-latency NVM 240. Since low-latency NVM 240 is still flash memory, the selection of a new and different location for snapshot 260B may be based on P/E cycles, BER, and other considerations. The log entries for JT 252B may be stored in a different journal from journal 270A, for example in journal 270B shown in FIG. 2D.

Snapshot 260B combines or merges the L2P mapping changes in the now closed journal structure, or JT 252A, with the previous snapshot, or snapshot 260A containing an L2P table for flash memory 203 that is consistent with an earlier point in time. For example, in one example process, one or more pages may be read from snapshot 260A, any updates from JT 252A for the logical address range of the one or more pages may be applied, the updated one or more pages may be written into snapshot 260B, and the process may repeat until all pages are processed from snapshot 260A. If no previous snapshot exists, then snapshot 260B can be created with only the L2P mappings in JT 252A. Thus, snapshot 260B is now created that is consistent with a time that is after snapshot 260A.

FIG. 2D illustrates a data flow diagram for an L2P table rebuild process with L2P management using low-latency NVM 240 in a storage device. Low-latency NVM 240 includes snapshot 260A, snapshot 260B, journal 270A, and journal 270B. With respect to FIGS. 2C and 2D, like numbered elements may correspond to like components.

Since low-latency NVM 240 is non-volatile, system 200 is resilient against power failures, even during snapshot updates. For example, assume that a power failure occurs while snapshot 260B is being built by combining snapshot 260A with JT 252A, as described above. When the storage device is restarted, everything in RAM 202 is lost except for log buffers 254, which may be stored in non-volatile memory on power failure. To prevent data corruption, the storage device may detect the power failure and restart, and transition into an offline mode wherein user data operations are not serviced. To rebuild the metadata structures in RAM 202, JT 252A can be rebuilt by inserting nodes parsed from journal 270A, and JT 252B can be rebuilt by inserting nodes parsed from journal 270B.

Note that the above rebuild process can proceed quickly and simply by reading and parsing batches of journal page data sequentially from journals 270A and 270B retrieved from low-latency NVM 240. This may compare favorably to more complicated rebuild processes that may be necessary when storing journal entries in flash memory 103, as with L2PD 130. For example, L2P metadata structures such as partition tables and super-partition tables can be omitted when using L2PD 230. Rebuild time at device startup can therefore be reduced, helping to minimize device downtime.

Once the journal structures are rebuilt and log buffers 254 are restored, then the storage device can be brought back online and L2PD 230 may resume servicing L2P requests, with further log buffers written to the tail of journal 270B. Meanwhile, the snapshotting process may resume exactly where it left off prior to the power failure, or at the tail of snapshot 260B. Once the snapshot update is complete, the older and outdated snapshot 260A and journal 270A may be freed and returned to unallocated free space. Alternatively, a number of older snapshots and journals may be retained for data recovery purposes.

Figure 4:
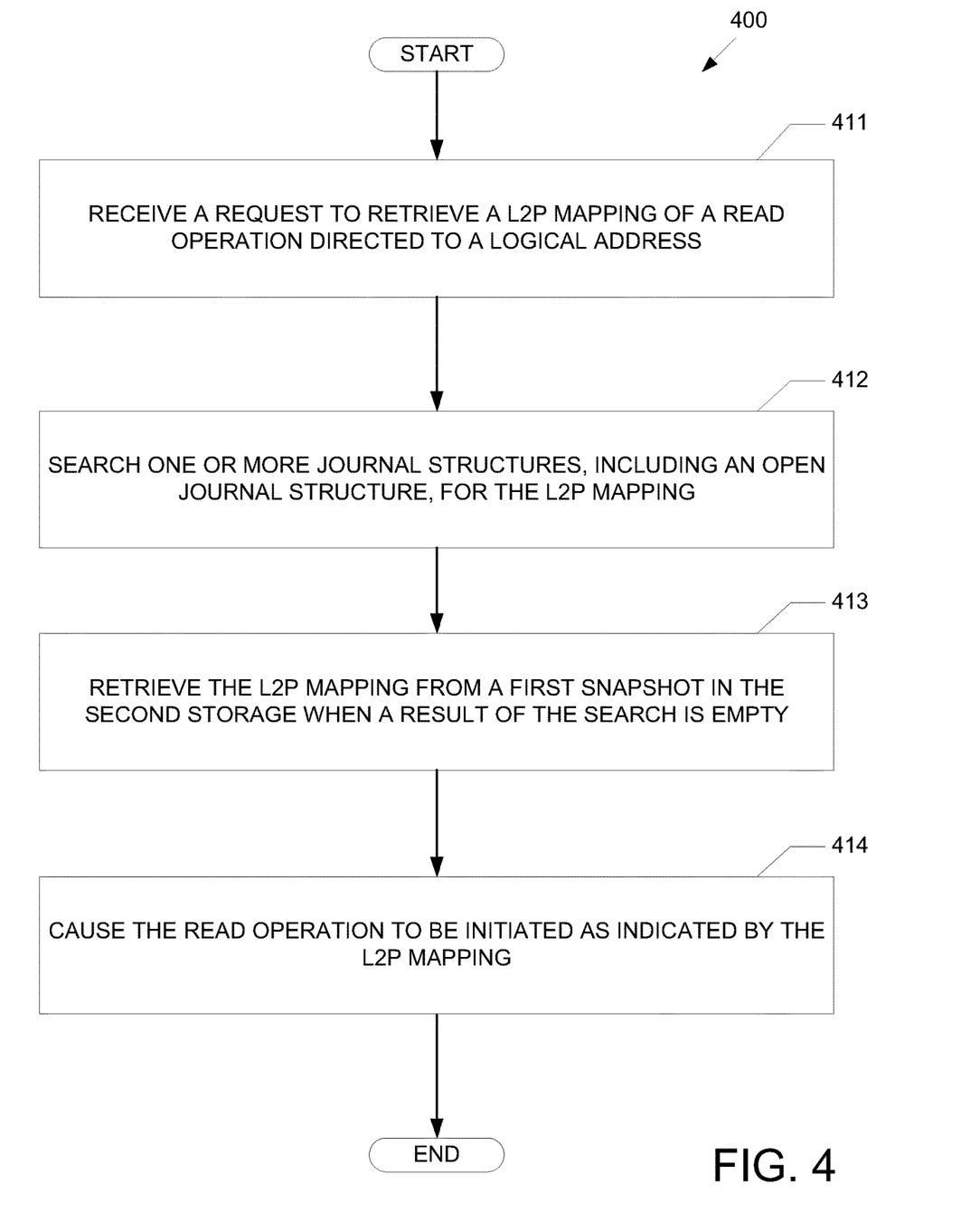
FIG. 4 is a flowchart illustrating an example process for processing a read operation with L2P management using low-latency NVM in a storage device.

Now that a write operation and a L2P table rebuild have been discussed, it may be instructive to examine a read operation. FIG. 4 is a flowchart illustrating an example process 400 for processing a read operation with L2P management using low-latency NVM in a storage device. One or more blocks of FIG. 4 may be executed by a computing system (including, e.g., a controller of a flash memory, a data storage controller of a data storage system or a solid state storage device (SSD), a processor, or the like). Examples of a computing system or a controller may be controller 501 and/or 507. Similarly, a non-transitory machine-readable medium may include machine-executable instructions thereon that, when executed by a computer or machine, perform the blocks of FIG. 4. The steps of process 400 may be implemented as hardware/firmware or software.

In block 411, referring to FIG. 2A, controller 201 receives a request to retrieve a logical to physical (L2P) mapping for a read operation directed to a logical address. L2PD 230 may, for example, receive a L2P request from FTL 220 for resolving a L2P mapping for a logical address, or a logical page index (LPI).

In block 412, referring to FIGS. 2A and 2B, controller 201 searches JT 252A and JT 252B for the L2P mapping. In some situations, a closed journal structure may not exist, in which case only the open journal structure is searched. Controller 201 may also search CET 250. Further, some or all of the searches may be conducted in parallel. When a L2P mapping that matches the requested logical address is found in any of these searched data structures, then the L2P mapping is retrieved and the search may end. Note that if the L2P mapping is found in CET 250, then the retrieved L2P mapping is actually a logical to cache mapping for data that has not yet been committed to flash memory 203, and the requested data can thus be read from the cache rather than from flash memory 203.

In block 413, referring to FIGS. 2A and 2C, controller 201 retrieves the L2P mapping from snapshot 260A in low-latency NVM 240 when a result of the search in block 412 is empty. For example, if the requested L2P mapping is not found in any of the metadata structures in RAM 202, including CET 250, JT 252A, and JT 252B, then L2PD 230 has no choice but to lookup the L2P mapping in the relatively slower low-latency NVM 240. Based on the requested logical address or LPI and the offset position of snapshot 260A in low-latency NVM 240, the page containing the requested L2P mapping in low-latency NVM 240 can be retrieved in block 413.

In block 414, referring to FIG. 2A, controller 201 causes the read operation to be initiated as indicated by the L2P mapping retrieved from block 412 or 413. For example, L2PD 230 may return the L2P mapping to FTL 220, which in turn initiates the read operation at the indicated physical address in flash memory 203. Alternatively, as discussed above, the read operation may retrieve the data from an indicated cache address of a cache in system 200.

Figure 5:
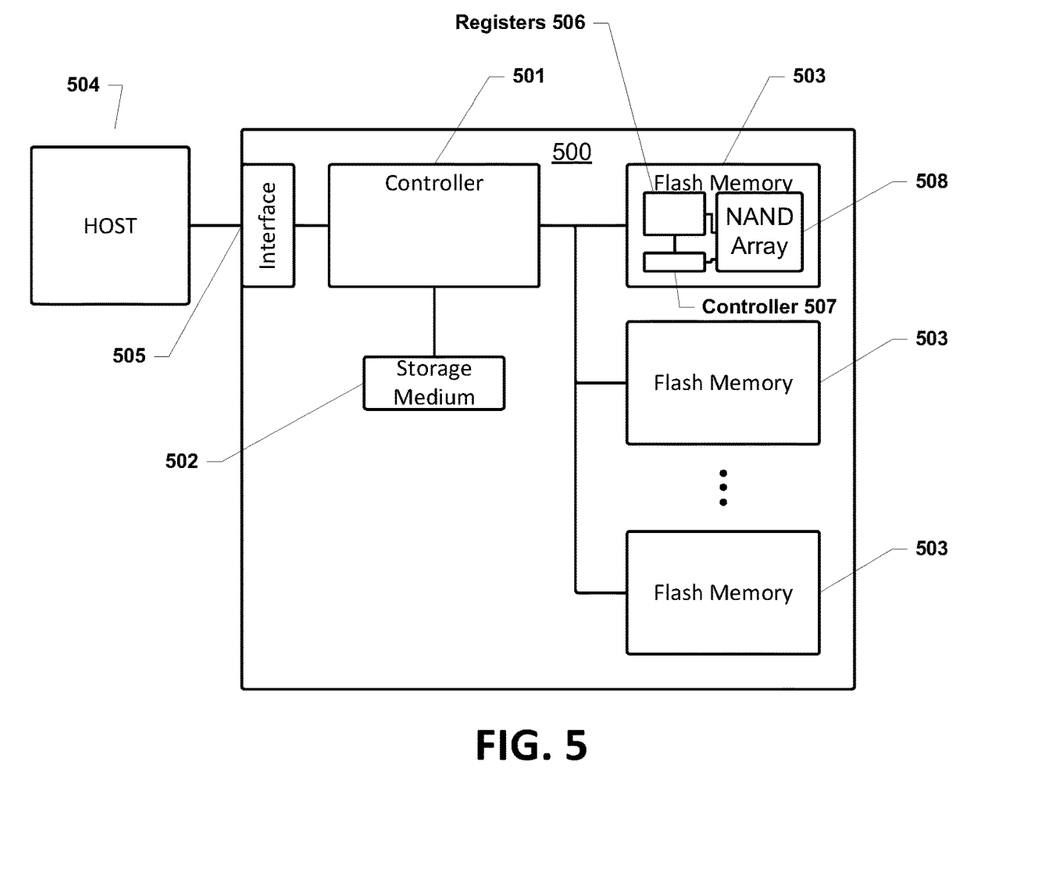
FIG. 5 is a block diagram illustrating components of an example data storage system.

FIG. 5 is a block diagram illustrating components of an example data storage system, according to aspects of the subject technology. As depicted in FIG. 5, in some aspects, data storage system 500 (e.g., a solid state drive) includes data storage controller 501, storage medium 502, and flash memory array 510 including one or more flash memory 503. Controller 501 may use storage medium 502 for temporary storage of data and information used to manage data storage system 500. Controller 501 may include several internal components (not shown) such as a read-only memory, a flash component interface (e.g., a multiplexer to manage instruction and data transport along a serial connection to flash memory 503), an I/O interface, error correction circuitry, and the like. In some aspects, all of these elements of controller 501 may be integrated into a single chip. In other aspects, these elements may be separated on their own PC board.

In some implementations, aspects of the subject disclosure may be implemented in data storage system 500. For example, aspects of the subject disclosure may be integrated with the function of data storage controller 501 or may be implemented as separate components for use in conjunction with data storage controller 501.

Controller 501 may also include a processor that may be configured to execute code or instructions to perform the operations and functionality described herein, manage request flow and address mappings, and to perform calculations and generate commands. The processor of controller 501 may be configured to monitor and/or control the operation of the components in data storage controller 501. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on ROM within controller 501 and/or its processor. One or more sequences of instructions may be software stored and read from storage medium 502, flash memory 503, or received from host device 504 (e.g., via host interface 505). ROM, storage medium 502, flash memory 503, represent examples of machine or computer readable media on which instructions/code executable by controller 501 and/or its processor may be stored. Machine or computer readable media may generally refer to any medium or media used to provide instructions to controller 501 and/or its processor, including volatile media, such as dynamic memory used for storage media 502 or for buffers within controller 501, and non-volatile media, such as electronic media, optical media, and magnetic media.

In some aspects, controller 501 may be configured to store data received from a host device 504 in flash memory 503 in response to a write command from host device 504. Controller 501 is further configured to read data stored in flash memory 503 and to transfer the read data to host device 504 in response to a read command from host device 504.

Host device 504 represents any device configured to be coupled to data storage system 500 and to store data in data storage system 500. Host device 504 may be a computing system such as a personal computer, a server, a workstation, a laptop computer, PDA, smart phone, and the like. Alternatively, host device 504 may be an electronic device such as a digital camera, a digital audio player, a digital video recorder, and the like.

In some aspects, storage medium 502 represents volatile memory used to temporarily store data and information used to manage data storage system 500. According to aspects of the subject technology, storage medium 502 is random access memory (RAM) such as double data rate (DDR) RAM. Other types of RAM also may be used to implement storage medium 502. Memory 502 may be implemented using a single RAM module or multiple RAM modules. While storage medium 502 is depicted as being distinct from controller 501, those skilled in the art will recognize that storage medium 502 may be incorporated into controller 501 without departing from the scope of the subject technology. Alternatively, storage medium 502 may be a non-volatile memory such as a magnetic disk, flash memory, peripheral SSD, and the like.

As further depicted in FIG. 5, data storage system 500 may also include host interface 505. Host interface 505 may be configured to be operably coupled (e.g., by wired or wireless connection) to host device 504, to receive data from host device 504 and to send data to host device 504. Host interface 505 may include electrical and physical connections, or a wireless connection, for operably coupling host device 504 to controller 501 (e.g., via the I/O interface of controller 501). Host interface 505 may be configured to communicate data, addresses, and control signals between host device 504 and controller 501. Alternatively, the I/O interface of controller 501 may include and/or be combined with host interface 505. Host interface 505 may be configured to implement a standard interface, such as Serial-Attached SCSI (SAS), Fiber Channel interface, PCI Express (PCIe), SATA, USB, and the like. Host interface 505 may be configured to implement only one interface. Alternatively, host interface 505 (and/or the I/O interface of controller 501) may be configured to implement multiple interfaces, which may be individually selectable using a configuration parameter selected by a user or programmed at the time of assembly. Host interface 505 may include one or more buffers for buffering transmissions between host device 504 and controller 501.

Flash memory 503 represents a non-volatile memory device for storing data. According to aspects of the subject technology, flash memory 503 includes, for example, a NAND flash memory. Flash memory 503 may include a single flash memory device or chip, or, as depicted by FIG. 5, may include multiple flash memory devices or chips arranged in multiple channels. Flash memory 503 is not limited to any particular capacity or configuration. For example, the number of physical blocks, the number of physical pages per physical block, the number of sectors per physical page, and the size of the sectors may vary within the scope of the subject technology.

Flash memory may have a standard interface specification so that chips from multiple manufacturers can be used interchangeably (at least to a large degree). The interface hides the inner working of the flash and returns only internally detected bit values for data. In aspects, the interface of flash memory 503 is used to access one or more internal registers 506 and an internal flash controller 507 for communication by external devices. In some aspects, registers 506 may include address, command, and/or data registers, which internally retrieve and output the necessary data to and from a NAND memory cell array 508. For example, a data register may include data to be stored in memory array 508, or data after a fetch from memory array 508, and may also be used for temporary data storage and/or act like a buffer. An address register may store the memory address from which data will be fetched to host 504 or the address to which data will be sent and stored. In some aspects, a command register is included to control parity, interrupt control, and the like. In some aspects, internal flash controller 507 is accessible via a control register to control the general behavior of flash memory 503. Internal flash controller 507 and/or the control register may control the number of stop bits, word length, receiver clock source, and may also control switching the addressing mode, paging control, coprocessor control, and the like.

In some aspects, registers 506 may also include a test register. The test register may be accessed by specific addresses and/or data combinations provided at the interface of flash memory 503 (e.g., by specialized software provided by the manufacturer to perform various tests on the internal components of the flash memory). In further aspects, the test register may be used to access and/or modify other internal registers, for example the command and/or control registers. In some aspects, test modes accessible via the test register may be used to input or modify certain programming conditions of flash memory 503 (e.g., read levels) to dynamically vary how data is read from the memory cells of memory arrays 508. Registers 506 may also include one or more data latches coupled to flash memory 503.

It should be understood that in all cases data may not always be the result of a command received from host 504 and/or returned to host 504. In some aspects, Controller 501 may be configured to execute a read operation independent of host 504 (e.g., to verify read levels or BER). The predicate words "configured to", "operable to", and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Controller 501 may perform the operations identified in blocks 311-316 and 411-414. Controller 501 may cause the operations identified in blocks 311-316 and 411-414 to occur, or controller 501 may provide instructions to cause or facilitate controller 507 (and registers 506) to perform operations identified in blocks 311-316 and 411-414.

Various examples of aspects of the disclosure are described below. These are provided as examples, and do not limit the subject technology.

One or more aspects of the subject technology provide a data storage device that may include a first storage comprising a first type of flash memory, a second storage comprising a second type of flash memory having lower latency than the first type of flash memory, a third storage, and a controller. The controller may be configured to receive a request to determine a logical to physical (L2P) mapping of a write operation directed to a logical address. The controller may also be configured to determine the L2P mapping of the logical address to a physical address in the first storage. The controller may also be configured to determine that the write operation has been committed to the first storage. The controller may also be configured to add a data entry, comprising the L2P mapping, to an open journal structure of a plurality of journal structures in the third storage. The controller may also be configured to add a log entry, comprising the L2P mapping, to a buffer in the third storage. The controller may also be configured to flush the buffer to a first journal in the second storage in response to determining that the buffer has satisfied a size threshold.

In other aspects, methods are provided for logical to physical (L2P) table management using low-latency NVM to reduce solid state drive (SSD) random access memory (RAM) footprint. According to some aspects, a method may include receiving a request to determine a logical to physical (L2P) mapping of a write operation directed to a logical address. The method may also include determining the L2P mapping of the logical address to a physical address in a first storage comprising a first type of flash memory. The method may also include determining that the write operation has been committed to the first storage. The method may also include adding a data entry, comprising the L2P mapping, to an open journal structure of a plurality of journal structures in a third storage. The method may also include adding a log entry, comprising the L2P mapping, to a buffer in the third storage. The method may also include flushing the buffer to a first journal in a second storage in response to determining that the buffer has satisfied a size threshold, wherein the second storage comprises a second type of flash memory having lower latency than the first type of flash memory, wherein each of the plurality of journal structures are configured to store up to a predetermined number of entries that is ⅛ or less than a maximum logical page index (LPI) for the first storage.

In further aspects, a system may include means for receiving a request to determine a logical to physical (L2P) mapping of a write operation directed to a logical address. The system may also include means for determining the L2P mapping of the logical address to a physical address in a first storage comprising a first type of flash memory. The system may also include means for determining that the write operation has been committed to the first storage. The system may also include means for adding a data entry, comprising the L2P mapping, to an open journal structure of a plurality of journal structures in a third storage, wherein the third storage is a volatile memory with a lower latency than a second storage. The system may also include means for adding a log entry, comprising the L2P mapping, to a buffer in the third storage. The system may also include means for flushing the buffer to a first journal in the second storage in response to determining that the buffer has satisfied a physical page size of the second storage, wherein the second storage comprises a second type of flash memory having lower latency than the first type of flash memory.

Various implementations of the methods and systems for providing logical to physical (L2P) table management using low-latency NVM to reduce solid state drive (SSD) random access memory (RAM) footprint provides several performance advantages that improve the functioning of the storage device or SSD. A host computer that interfaces with the storage device is also provided with improved functioning by operating the storage device with higher performance and storage capacity. Thus, the described methods and systems provide performance benefits that improve the functioning of a storage device and a host computer.

It is understood that other configurations of the subject technology will become readily apparent to those skilled in the art from the detailed description herein, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A data storage device, comprising:
   a first storage;
   a second storage having lower latency than the first storage;
   a third storage; and
   a controller configured to:
   determine a logical to physical (L2P) mapping of a logical address to a physical address in the first storage, for an operation directed to the logical address;
   add a data entry, comprising the L2P mapping, to an open journal structure in the third storage;
   add a log entry, comprising the L2P mapping, to a buffer in the third storage;
   flush the buffer into the second storage in response to determining that the buffer has satisfied a size threshold;
   convert the open journal structure to a closed journal structure in response to determining that the open journal structure is full;
   read a first snapshot, corresponding to an L2P table of the first storage consistent with a first time, from a first location in the second storage;

merge the first snapshot with the closed journal structure to generate a second snapshot, corresponding to an L2P table of the first storage consistent with a second time after the first time; and write the second snapshot at a second location in the second storage, wherein the second location is different from the first location.

2. The data storage device of claim 1, wherein the first storage comprises a first type of flash memory, the second storage comprises a second type of flash memory, and the third storage comprises volatile memory having lower latency than the second storage.

3. The data storage device of claim 1, wherein the operation is a write operation, and wherein the controller is configured to add the data entry and add the log entry in response to determining that the write operation has been committed to the first storage.

4. The data storage device of claim 1, wherein the controller is further configured to:
receive another request to retrieve another L2P mapping of a read operation directed to another logical address;
search one or more journal structures, including the open journal structure, for the another L2P mapping;
retrieve the another L2P mapping from a third snapshot in the second storage when a result of the search is empty; and
cause the read operation to be initiated as indicated by the another L2P mapping.

5. The data storage device of claim 4, wherein the controller is configured to search a cache entry tree (CET) for a cache address that corresponds to the L2P mapping.

6. The data storage device of claim 1, wherein the controller is further configured to:
determine that a power failure occurred and the data storage device has restarted in an offline mode;
rebuild a plurality of journal structures, including the open journal structure, in the third storage based on parsing a first journal in the second storage;
restore the buffer from a copy stored in a non-volatile memory in response to the power failure; and
switch the data storage device to an online mode.

7. The data storage device of claim 6, wherein the plurality of journal structures includes a closed journal structure, and wherein the controller is configured to rebuild the closed journal structure of the plurality of journal structures based on parsing a second journal in the second storage.

8. The data storage device of claim 6, wherein each of the plurality of journal structures are configured to store up to a predetermined number of entries that is ⅛ or less than a maximum logical page index (LPI) for the first storage.

9. The data storage device of claim 1, wherein the size threshold corresponds to a physical page size of the second storage.

10. A method implemented using one or more controllers for one or more storage devices, the method comprising:
determining a logical to physical (L2P) mapping of a logical address to a physical address in a first storage, for an operation directed to the logical address;
adding a data entry, comprising the L2P mapping, to an open journal structure in a third storage;
adding a log entry, comprising the L2P mapping, to a buffer in the third storage; and
flushing the buffer into a second storage in response to determining that the buffer has satisfied a size threshold, the second storage having lower latency than the first storage,
wherein the open journal structure is configured to store up to a predetermined number of entries that is ⅛ or less than a maximum logical page index (LPI) for the first storage, and
wherein the method further comprises:
converting the open journal structure to a closed journal structure in response to determining that the open journal structure is full;
reading a first snapshot, corresponding to an L2P table of the first storage consistent with a first time, from a first location in the second storage;
merging the first snapshot with the closed journal structure to generate a second snapshot; and
writing the second snapshot at a second location in the second storage, wherein the second location is different from the first location.

11. The method of claim 10, wherein the first storage comprises a first type of flash memory, the second storage comprises a second type of flash memory, and the third storage comprises volatile memory having lower latency than the second storage.

12. The method of claim 10, wherein the operation is a write operation, and wherein the data entry and the log entry are added in response to determining that the write operation has been committed to the first storage.

13. The method of claim 10, further comprising:
receiving another request to retrieve another L2P mapping of a read operation directed to another logical address;
searching one or more journal structures, including the open journal structure, for the another L2P mapping;
retrieving the another L2P mapping from a third snapshot in the second storage when a result of the search is empty; and
causing the read operation to be initiated as indicated by the another L2P mapping.

14. The method of claim 13, wherein searching comprises searching a cache entry tree (CET) for a cache address that corresponds to the L2P mapping.

15. The method of claim 10, wherein the second snapshot corresponds to an L2P table of the first storage consistent with a second time after the first time.

16. The method of claim 10, further comprising:
determining that a power failure occurred and the one or more storage devices have restarted in an offline mode;
rebuilding a plurality of journal structures, including the open journal structure, in the third storage based on parsing a first journal in the second storage;
restoring the buffer from a copy stored in a non-volatile memory in response to the power failure; and
switching the one or more storage devices to an online mode.

17. A system, comprising:
means for determining a logical to physical (L2P) mapping of a logical address to a physical address in a first storage, for an operation directed to the logical address;
means for adding a data entry, comprising the L2P mapping, to an open journal structure in a third storage;
means for adding a log entry, comprising the L2P mapping, to a buffer in the third storage;
means for flushing the buffer into a first journal of a second storage in response to determining that the buffer has satisfied a size threshold, the second storage having lower latency than the first storage;
means for converting the open journal structure to a closed journal structure in response to determining that the open journal structure is full;

means for reading a first snapshot, corresponding to an L2P table of the first storage consistent with a first time, from a first location in the second storage;

means for merging the first snapshot with the closed journal structure to generate a second snapshot; and means for writing the second snapshot at a second location in the second storage, wherein the second location is different from the first location.

18. The system of claim 17, wherein the second snapshot corresponds to an L2P table of the first storage consistent with a second time after the first time.

* * * * *